United States Patent
Royyuru et al.

(10) Patent No.: US 11,748,744 B2
(45) Date of Patent: Sep. 5, 2023

(54) SOURCE INDEPENDENT CONSISTENT TOKENIZATION

(71) Applicant: First Data Corporation, Coral Springs, FL (US)

(72) Inventors: Vijay Royyuru, Norristown, PA (US); Renee Goodheart, Midland Park, NJ (US); Lanny Byers, Ridgefield, CT (US); Timothy Horton, Papillion, NE (US); Kathryn Whalen, New York, NY (US); Lixia Zhu, New York, NY (US)

(73) Assignee: FIRST DATA CORPORATION, Coral Springs, FL (US)

( * ) Notice: Subject to any disclaimer, the term of this patent is extended or adjusted under 35 U.S.C. 154(b) by 473 days.

(21) Appl. No.: 16/837,718

(22) Filed: Apr. 1, 2020

(65) Prior Publication Data
US 2020/0320516 A1    Oct. 8, 2020

Related U.S. Application Data
(60) Provisional application No. 62/828,729, filed on Apr. 3, 2019.

(51) Int. Cl.
G06Q 20/36      (2012.01)
G06Q 20/38      (2012.01)

(52) U.S. Cl.
CPC ..... *G06Q 20/3674* (2013.01); *G06Q 20/3672* (2013.01); *G06Q 20/388* (2013.01)

(58) Field of Classification Search
None
See application file for complete search history.

(56) References Cited

U.S. PATENT DOCUMENTS

| 5,883,810 A | 3/1999 | Franklin et al. |
|---|---|---|
| 10,146,803 B2 | 12/2018 | Kilby et al. |

(Continued)

FOREIGN PATENT DOCUMENTS

| EP | 3 292 499 A1 | 3/2018 |
|---|---|---|
| EP | 3 292 499 B1 | 3/2018 |

(Continued)

OTHER PUBLICATIONS

Extended European Search Report, EP Application No. 207828989 dated Jun. 28, 2021, 10 pages.

(Continued)

*Primary Examiner* — Neha Patel
*Assistant Examiner* — Nicholas K Phan
(74) *Attorney, Agent, or Firm* — FOLEY & LARDNER LLP

(57) ABSTRACT

A gateway encryption service is used to ensure consistent, source independent tokenization for payment accounts and synchronizing payment account information with merchants. A consistent, evergreen merchant-facing token is generated and used for each payment account for the merchant, ensuring that regardless of the payment method used by the customer (e.g., plastic card point-of-sale, pay wallet, saved card information) for the same underlying account, the merchant has a single token. Further, if the account number for the underlying payment account changes (e.g., the card expires or is stolen) the merchant-facing token remains consistent. The evergreen token ensures that the system functions more efficiently, saving resources in processing and storage and ensuring less network traffic for failed transactions. The system further implements encryption and security despite the consistent tokenization, further saving resources.

14 Claims, 10 Drawing Sheets

(56) References Cited

U.S. PATENT DOCUMENTS

| | | |
|---|---|---|
| 10,460,312 B1 | 10/2019 | Kurani et al. |
| 10,467,622 B1 | 11/2019 | Rule et al. |
| 2005/0173520 A1 | 8/2005 | Jaros et al. |
| 2008/0052225 A1 | 2/2008 | Walker et al. |
| 2009/0259560 A1 | 10/2009 | Bachenheimer |
| 2010/0123003 A1 | 5/2010 | Olson et al. |
| 2013/0144776 A1 | 6/2013 | Webster et al. |
| 2013/0151400 A1 | 6/2013 | Makhotin et al. |
| 2014/0344153 A1* | 11/2014 | Raj .................. G06Q 20/3821 705/44 |
| 2015/0032625 A1 | 1/2015 | Dill et al. |
| 2015/0073996 A1 | 3/2015 | Makhotin et al. |
| 2015/0088756 A1 | 3/2015 | Makhotin et al. |
| 2015/0140982 A1 | 5/2015 | Postrel |
| 2015/0269566 A1 | 9/2015 | Gaddam et al. |
| 2015/0327072 A1 | 11/2015 | Powell et al. |
| 2015/0332262 A1 | 11/2015 | Lingappa |
| 2016/0036790 A1 | 2/2016 | Shastry et al. |
| 2016/0071094 A1* | 3/2016 | Krishnaiah .......... G06Q 20/363 705/66 |
| 2016/0078434 A1 | 3/2016 | Huxham et al. |
| 2016/0094991 A1 | 3/2016 | Powell et al. |
| 2016/0119296 A1 | 4/2016 | Laxminarayanan et al. |
| 2016/0140545 A1 | 5/2016 | Flurscheim et al. |
| 2016/0173483 A1 | 6/2016 | Wong et al. |
| 2016/0260096 A1 | 9/2016 | Lacoss-Arnold et al. |
| 2016/0267445 A1 | 9/2016 | Nano |
| 2016/0292673 A1 | 10/2016 | Chandrasekaran |
| 2016/0321652 A1* | 11/2016 | Dimmick ............. H04L 63/083 |
| 2016/0328707 A1 | 11/2016 | Wagner et al. |
| 2016/0364721 A1 | 12/2016 | Deliwala et al. |
| 2017/0032362 A1 | 2/2017 | Lahkar et al. |
| 2017/0200165 A1* | 7/2017 | Laxminarayanan .. H04L 63/062 |
| 2018/0253718 A1 | 9/2018 | Khan et al. |
| 2018/0253727 A1* | 9/2018 | Ortiz ................... G06Q 20/108 |
| 2018/0276657 A1 | 9/2018 | Cho et al. |
| 2019/0066096 A1 | 2/2019 | Wouters et al. |
| 2019/0066102 A1 | 2/2019 | Powell et al. |
| 2019/0108514 A1 | 4/2019 | Pendse et al. |
| 2019/0385164 A1 | 12/2019 | Royyuru et al. |
| 2020/0082371 A1 | 3/2020 | Laracey |
| 2020/0320516 A1 | 10/2020 | Royyuru et al. |
| 2021/0117965 A1 | 4/2021 | Venot et al. |

FOREIGN PATENT DOCUMENTS

| | | |
|---|---|---|
| KR | 101814133 B1 | 1/2018 |
| KR | 101814134 B1 | 1/2018 |
| WO | WO-2015/107442 A1 | 7/2015 |
| WO | WO-2017/160877 A1 | 9/2017 |

OTHER PUBLICATIONS

International Search Report and Written Opinion dated Jun. 29, 2020 in related application No. PCT/US2020/026352, all pgs.

Extended European Search Report dated Nov. 12, 2021, EP Application No. EP 19823010.4, 9 pages.

International Search Report and Written Opinion dated Feb. 11, 2022, International Patent Application No. PCT/US2021/033110, 13 pages.

International Search Report and Written Opinion dated Sep. 10, 2019 in related foreign application No. PCT/US2019/037654, 7 pgs.

* cited by examiner

SOURCE INDEPENDENT CONSISTENT TOKENIZATION

CROSS REFERENCE TO RELATED APPLICATIONS

This application is a nonprovisional of and claims the benefit of and priority to U.S. Provisional Application No. 62/828,729, filed Apr. 3, 2019, entitled "SOURCE INDEPENDENT CONSISTENT TOKENIZATION," the content of which is herein incorporated by reference in its entirety for all purposes.

BACKGROUND

Banks and other credit providers (i.e., issuers) often issue cards for fund use to users, making fast payment quick and easy for users through the use of a credit or debit card. These issuers often also offer the ability to users to save their information to merchants and mobile device pay wallets, so that a user need not have their physical credit card available to buy goods and services. In existing systems, when a user provides a different form of payment to a merchant that uses the same underlying issuer account (e.g., the user provides a credit card for the first transaction and uses the same account to pay for a second transaction using a pay wallet), the merchant does not know that the same user and account are transacting with the merchant for both transactions. Also, when the user has to have a new card issued due to theft or expiration, the merchant cannot resolve the new credit card number for the same account with the old credit card number.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for source independent consistent tokenization. The system may by a gateway encryption service that includes one or more processors and one or more memories with instructions for execution by the processors. The instructions are configured to cause the system to receive, from a merchant server, an authorization request for a transaction. The request may include a primary account number ("PAN") for an account of a customer. The system may generate a token associated with the PAN. The system may request and receive authorization from an issuing host platform based on the PAN. In response, the system may transmit, to the merchant server, an indication of the authorization that includes the token. The system may receive, from the merchant server, a second authorization request for a second transaction, the second authorization request including a second token representing the account of the customer, where the second token is different from the first token or the primary account number. The system detokenizes the second token and identifies the first token based on the detokenized second token. The system may request and receive a second authorization for the second transaction from the issuing host platform based on the second token. The system then transmits, to the merchant server, an indication of the second authorization for the second transaction including the first token. By using the first token, the merchant receives and uses the consistent token regardless of the payment form for the underlying account that the user uses to process the transaction. Other embodiments of this aspect include corresponding computer systems, apparatus, and computer programs recorded on one or more computer storage devices, each configured to perform the actions of the methods.

Implementations may include one or more of the following features. Optionally, the second token represents a pay wallet token for the account of the customer. Optionally, the primary account number received from the merchant server is encrypted. Optionally, identifying the first token based on the detokenized second token includes obtaining a merchant token from a token service provider based on the detokenized second token and searching a mapping database for the first token based on the merchant token. Optionally, identifying the first token based on the detokenized second token includes obtaining the primary account number based on the detokenized second token and searching a mapping database for the first token based on the primary account number. Optionally, the system may receive, from the merchant server, a third authorization request for a third transaction, the third authorization request including the first token. The system may identify a merchant token associated with the primary account number based on the first token. The system may request and receive a third authorization for the third transaction from an issuing host platform based on the merchant token. In response to the authorization, the system may transmit, to the merchant server, an indication of the third authorization for the third transaction including the first token. Implementations of the described techniques may include hardware, a method or process, or computer software on a computer-accessible medium.

Another embodiment includes a system for synchronizing payment account information with merchants. The system may be a gateway encryption service that includes one or more processors and one or more memories with instructions for execution by the processors. The instructions are configured to cause the system to receive, from an issuer server, a primary account number for a payment account of a user and a list including a) a plurality of merchant names, where each merchant name corresponds to a respective one of the plurality of merchants and b) an access link for each of the plurality of merchants. The system may obtain a token status for each merchant in the list, where each token status is associated with the primary account number and the associated merchant. The system may provide the token status for each merchant in the list to the issuer server. The system may receive a request to facilitate saving the payment account to a first merchant from the list, the request including merchant provision data for the first merchant. The system may obtain a merchant token associated with the first merchant and the payment account based on the merchant provision data and the primary account number for the payment account. The system may transmit the merchant token to a merchant server of the first merchant and receive, in response, confirmation that the first merchant successfully saved the merchant token. In response to the confirmation, the system may transmit a success indication to the issuer server. Other embodiments of this aspect include corresponding computer systems, apparatus, and computer programs recorded on one or more computer storage devices, each configured to perform the actions of the methods.

Implementations may include one or more of the following features. Optionally, obtaining a merchant token associated with the first merchant and the payment account includes transmitting a provision request to a token service provider, the provision request including at least a portion of the merchant provision data. The system may receive, in response to the provision request, an issuer token from the token service provider, where the merchant token is different from the issuer token. The system may save the merchant token, the issuer token, and a mapping that associates the merchant token and the issuer token in a secure data store. Optionally, obtaining a merchant token associated with the first merchant and the payment account includes saving the merchant token, the primary account number, and a mapping that associates the merchant token and the primary account number in a secure data store. Optionally, the request to facilitate saving the payment account to the first merchant includes an indication that the payment account is a default payment account at the first merchant for the user. The system may transmit the merchant token to the merchant server of the first merchant including an indication to save the merchant token as the default payment account for the user. Implementations of the described techniques may include hardware, a method or process, or computer software on a computer-accessible medium.

Another embodiment includes a system for synchronizing payment account information at a merchant. The system may be a gateway encryption service that includes one or more processors and one or more memories with instructions for execution by the processors. The instructions are configured to cause the system to receive, from a merchant server of a merchant, a save request to facilitate saving a payment account of a user at the merchant server. The system may transmit, for display via a merchant user interface of the merchant and responsive to receiving the save request, a form including a data entry field for the user to enter a primary account number of the payment account. The system may receive the primary account number received from the user via the form. The system may generate a first token associated with the merchant and the payment account and transmit the first token to the merchant server. Other embodiments of this aspect include corresponding computer systems, apparatus, and computer programs recorded on one or more computer storage devices, each configured to perform the actions of the methods.

Implementations may include one or more of the following features. Optionally, the system may transmit a provision request to a token service provider, the provision request including the primary account number and an indication of the merchant. The system may receive, in response to the provision request, a second token associated with the primary account number and the merchant. Optionally, generating the first token includes saving the first token, the second token, and a mapping that associates the first token and the second token in a secure data store. Optionally, the system may save the first token, the primary account number, and a mapping that associates the first token and the primary account number in a secure data store. Implementations of the described techniques may include hardware, a method or process, or computer software on a computer-accessible medium.

DETAILED DESCRIPTION

Figure 1:
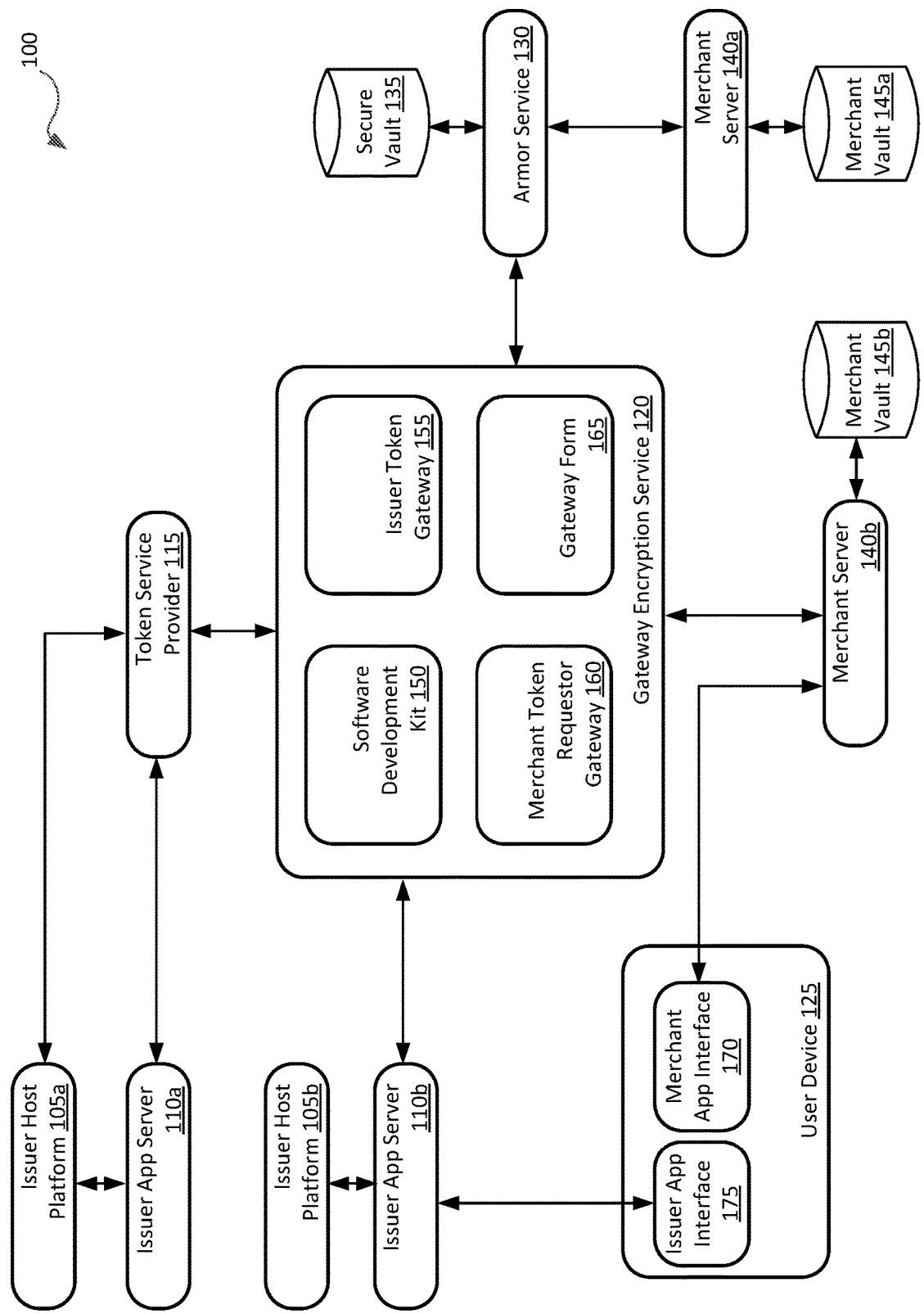
FIG. 1 illustrates a system for source independent consistent tokenization, according to an embodiment.

Customers use credit and debit cards for many purchases every day. As technology advances, a customer is no longer required to swipe a plastic card to use an associated credit or debit account. For example, customers can enter card information online and save it to a merchant website for later use. As another example, customers may set up a pay wallet in their mobile device. Such pay wallets include, for example, Apple Pay® from Apple Inc., Google Pay™ from Google LLC, and Samsung Pay® from Samsung. Therefore, a customer may have a single credit or debit account that is used for various transactions including a purchase using the account through a pay wallet, an online purchase using saved card information, and swiping the plastic card associated with the account at the merchant. However, a merchant that processes transactions for the same customer using the same payment account through these various forms of payment may not recognize them as being the same customer and payment account. For example, a pay wallet has a pay wallet number associated with the account to protect the primary account number. Therefore, since the swiped card having the primary account number differs from the pay wallet account number, the merchant may not be able to correlate the two transactions.

Additionally, if the user's primary account number changes because, for example, their credit card is lost or stolen, a new card may issue having a new account number. When this happens, the user soon usually discovers that all of their saved card information is no longer available at the merchants where it was saved. Transactions using the saved information fail because the old card information is no longer valid. Further, a customer having the card on file at a merchant that bills a monthly fee may find their service cancelled because payment fails on the new account number using the saved card information.

The above described issues create system inefficiencies. The merchant stores unnecessary information, perhaps for long time periods because of the unknown relationships. Unnecessary processor cycles occur because the merchant has outdated or incorrect information and has to obtain new, correct information. Additionally, unnecessary network traffic is generated due to the merchant needing to obtain and authorize updated card information. The described solutions herein reduce the unnecessary network traffic by keeping the card information evergreen for the merchant using consistent tokenization. Further, the merchant need not unnecessarily store duplicate information because the single, evergreen token will map to the proper payment sources. Finally, the failed transactions will be minimized, so the network traffic and unnecessary processor cycles will be eliminated. These benefits improve the overall technology and the underlying computer systems.

Described herein are methods and systems for synchronizing account information between the payment account issuer and merchants. For example, when a new card issues with an updated primary account number, the merchant may pull or the issuer may push the updated card information to the merchant to provide a seamless experience for the customer.

Other methods and systems include generating and providing a consistent merchant-facing token for the payment account to ensure that regardless of the payment form used (e.g., pay wallet, swipe a plastic card, saved card on file at merchant), the merchant receives the same token indicating the payment account so that transactions can be correlated even if differing payment forms are used.

FIG. 1 illustrates a system 100 for consistent tokenization, encryption, and synchronization of payment account information between an issuer and a merchant. The system 100 can include issuer host platforms 105, issuer app servers 110, token service provider 115, gateway encryption service 120, user device 125, armor service 130, secure vault 135, merchant servers 140, and merchant vaults 145. Other components not described in system 100 may be included and/or components described in system 100 may be excluded while still performing the described functionality of system 100 without departing from the scope. Further, components may be combined or further separated while still performing the described functionality of system 100 and without departing from the scope of the present disclosure.

The issuer host platform 105 may be any server operated by an account issuer that can be used to authorize account information for customer accounts issued by the card issuer. The card issuer may be any suitable debit or credit card issuer or any issuer of any payment method or account. Multiple issuers may exist (e.g., JPMorgan Chase & Co, Wells Fargo, Bank of America Corporation, Capital One, and so forth), so there may be many issuer host platforms 105 (shown are two—issuer host platform 105a and 105b). Further, each issuer may have more than one issuer host platform 105. Issuer host platform 105 may be a computer device such as computer system 900 as described with respect to FIG. 9.

Issuer application server 110 may be any server used to host a customer application by the issuer. For example, a mobile application and/or a web application may be provided by issuer app server 110. Issuer app server 110 may be a computer device such as computer system 900 as described with respect to FIG. 9. Two issuer app servers 110a and 110b are depicted in FIG. 1, but there may be many issuer app servers 110. For example, some issuers may have multiple issuer app servers 110, and there may be many issuers, each having one or more issuer app server 110.

The token service provider 115 may provide a token service for digital use of the payment account. For example, when sending digital payment information, the full account information, such as the 16-digit primary account number may not be sent to protect the account information. Rather, a token may be generated and assigned to the 16-digit primary account number. The token service provider 115 may receive and validate requests for transactions of a payment account with encrypted provision data and activation data. The token service provider 115 may authorize the token and provide notification of the approval to the gateway encryption service 120 as well as the issuing host platform 105. While only one token service provider 115 is depicted in FIG. 1, any number of token service providers 115 may be included in system 100. Token service provider 115 may be, for example First Data Universal Token Service® by First Data Corporation® or Visa Token Service® by Visa Inc®. The token service provider 115 may be a service provided on a computer system (e.g., a server) such as computer system 900 of FIG. 9. Some issuers, such as issuers associated with issuer host platform 105b may not use a token service provider 115. In such cases, the primary account number may be encrypted and used to authorize transactions on the customer's account.

Gateway encryption service 120 may be a collection of services and components provided for issuers and merchants that include software development kit 150, issuer token gateway 155, merchant token requestor gateway (MTRG) 160, and gateway form 165. Gateway encryption service 120 may be provided by one or more computer systems (e.g., a server) such as computer system 900 of FIG. 9. While a single gateway encryption service 120 is shown in FIG. 1, any number of gateways 150 may be included. The gateway encryption service 120 provides functionality to generate and identify a unique merchant-facing token for each merchant and payment account combination, and consistently provide that same merchant-facing token to the merchant regardless of the payment form used by the customer. Gateway encryption service 120 further provides an interface to for the issuer to communicate tokens and PAN information securely to merchants. Gateway encryption service 120 may also include the armor service 130, though they may be hosted on different servers or hardware. Gateway encryption service 120 may include more or fewer components without departing from the scope of the described functionality.

Software development kit 150 is a software development kit that may be provided to issuers and/or merchants to use for developing the functionality for synchronization and consistent tokens (merchant-facing tokens for merchants and issuer tokens for issuers) into their applications including issuer application 175 and merchant application 170. In addition, the issuer application server 110 and merchant server 140 may utilize the software development kit 150 to interface with the gateway encryption service 120.

Issuer token gateway 155 may provide a gateway for the gateway encryption service 120 to communicate with the token service provider 115 and the issuer host platform 105a. The benefit is that the issuer does not have to interface directly and uniquely with each token service provider. The issuer token gateway 155 can provide normalized access to all token service providers, to generate issuer tokens, and provide similar benefits to the issuer as the merchant-facing tokens provide to the merchants. The issuer token associated with a primary account number provides a consistent token for the underlying account, even if the primary account number changes. This allows the gateway encryption service 120 to maintain evergreen tokens (i.e., tokens that are consistent and correct) for both the issuer and the merchant.

Merchant token requestor gateway (MTRG) 160 may provide an interface for the merchant to request a token associated with the payment account. Each merchant receives a unique token for each payment account, and two merchants will receive different, unique tokens for the same payment account. However, once a token is issued to a merchant for a payment account, MTRG 160 may consistently provide the same token to the merchant for any transaction involving that same payment account, regardless of the method of payment as described further herein. This provides benefits and system efficiencies for limiting network traffic, storage, and processing power. For example, the merchant needs to save only a single merchant-facing token for the customer's underlying payment account, regardless of whether the customer stores the credit account information for later use, swipes a plastic card, pays online, or pays with a pay wallet. Further, because the merchant-facing token remains evergreen via the MTRG 160 even if the underlying payment account primary account number changes, the number of failed transactions is minimized, saving processing power and network traffic. MTRG 160 may perform many functions including getting a token for a primary account number and assigning the token to a specified merchant (i.e., a merchant token), push provision a token to a merchant for a payment method (e.g., new credit card) when a user obtains a new payment method and requests that the card be provided to the merchant, track the token lifecycle to ensure that the merchant token remains evergreen through changes to the underlying payment method (e.g., new primary account number assigned and so forth), obtain metadata for a payment method, and provide the gateway for a transaction to be completed when a user attempts to use a payment method at a merchant.

Gateway form 165 may be a form provided by the gateway encryption service 120 via a merchant application interface 170 to allow a customer to enter their credit card information. The form is shown via a redirect or a webview such that it appears to the customer that the customer is still within the merchant application. In fact, in some embodiments, rather than providing the user account information to the merchant, it is provided to the gateway encryption service 120 via the gateway form 165 so that a merchant-facing token can be associated with the payment account for that merchant and provided to the merchant. The gateway form can include any entry interface including data entry fields for the customer to enter the primary account number, account holder's name, address, telephone number, and the like. In this way, the merchant never receives the user's primary account number or other account information, protecting the underlying account information for the user.

Merchant server 140 may be may be any server used to host a customer application by the merchant. For example, a mobile application and/or a web application may be provided by merchant server 140. Merchant server 140 may interface with merchant application 170 to provide the customer access to the customer's account with the merchant. Merchant server 140 may be a computer device such as computer system 900 as described with respect to FIG. 9. Two merchant servers 140*a* and 140*b* are depicted in FIG. 1, but there may be many merchant servers 110. For example, some merchants may have multiple merchant servers 140, and there may be many merchants, each having one or more merchant servers 140. Further, while merchant server 140*a* is not depicted as communicating with a merchant application interface 170, each merchant server may have a merchant application served and/or supported by merchant server 140.

Merchant vault 145 may be any suitable secure database to store customer information including payment account information such as the merchant-facing token provided by MTRG 160. Merchant vault 145 may be served by one or more computer systems (e.g., servers) such as computer system 900 of FIG. 9. Two merchant vaults 145*a* and 145*b* are depicted, however any number of merchant vaults 145 may be included in system 100. For example, merchants may have more than one merchant vault 145, and there may be many merchants, each having one or more merchant vaults 145.

Figure 9:
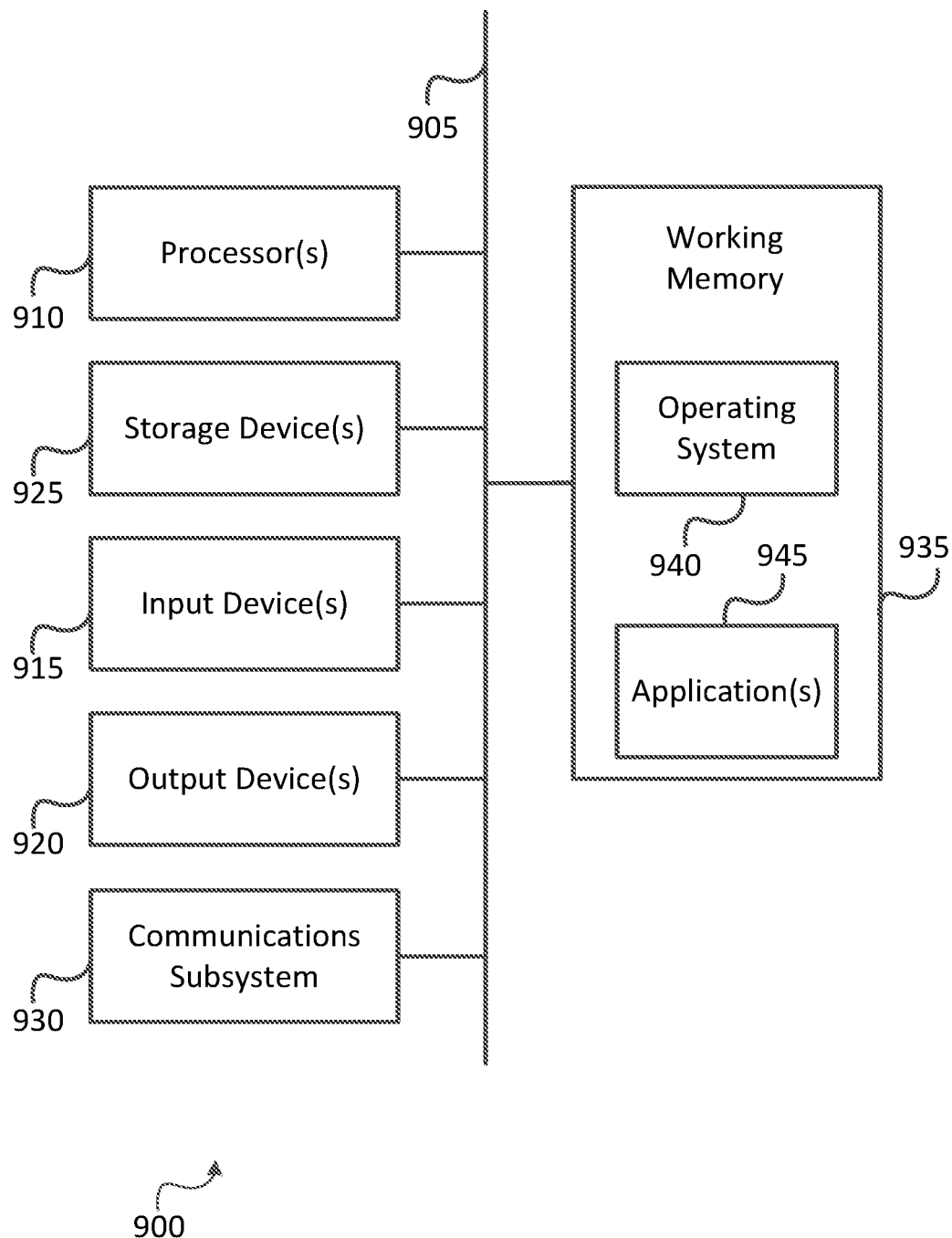
FIG. 9 illustrates a computer system.

Armor service 130 may be a service provided by a computer system (e.g., server) such as computer system 900 of FIG. 9. Armor service 130 may be a service, such as TransArmor® from First Data Corporation. Armor service 130 may be subscribed to by some merchants (e.g., merchant associated with merchant server 140*a*) but not by other merchants (e.g., merchant associated with merchant server 140*b*). Armor service 130 may provide a token solution for merchants so that merchants may receive a token to represent the customer's card. However, not all merchants utilize this armor service 130 (e.g., merchant associated with merchant server 140*b* does not use armor service 130). Further, existing armor services 130 may provide a merchant token to the merchant server 140*a* for a customer swiping a card at the merchant's place of business and a different merchant token to the merchant server 140*a* for the same customer using the same payment account via a pay wallet.

Secure vault 130 may be any suitable secure database to store merchant and customer account token information. For example, the merchant-facing token for merchant associated with merchant server 140*a* for each customer account used may be stored in secure vault 130. Secure vault 130 may be served by one or more computer systems (e.g., servers) such as computer system 900 of FIG. 9. While only one secure vault 135 is depicted in FIG. 1, more than one secure vault 135 may be included in system 100.

User device 125 may be any device used by a customer to interface with an issuer and/or merchant. User device 125 may be, for example, a desktop computer, a laptop computer, a tablet, a smartphone, and the like. User device 125 may include merchant application 170 and/or issuer application 175. While only one user device 125 is depicted, any number of user devices 125 may be included in system 100.

Merchant application interface 170 may be a software user interface application provided by the merchant. Each merchant may provide one or more merchant application interfaces 170. The merchant application interface 170 may provide access to the merchant server 140*b* via a mobile app, a web interface, or any other suitable customer-facing application. The merchant application interface 170 (also called an issuer app herein) may be a software application that is installed on a customer's user device 125 and allows the user to access the user's merchant account information from the merchant.

Issuer application interface 175 may be a software user interface application provided by the card issuer. Each issuer may provide one or more issuer application interfaces 175. The issuer application interface 175 may provide access to the issuer application server 110 via a mobile app, a web interface, or any other suitable customer-facing application. The issuer application interface 175 (also called an issuer app herein) may be a software application that is installed on a customer's mobile device or any other customer device and allows the user to access the user's payment account information from the issuer.

Figure 2:
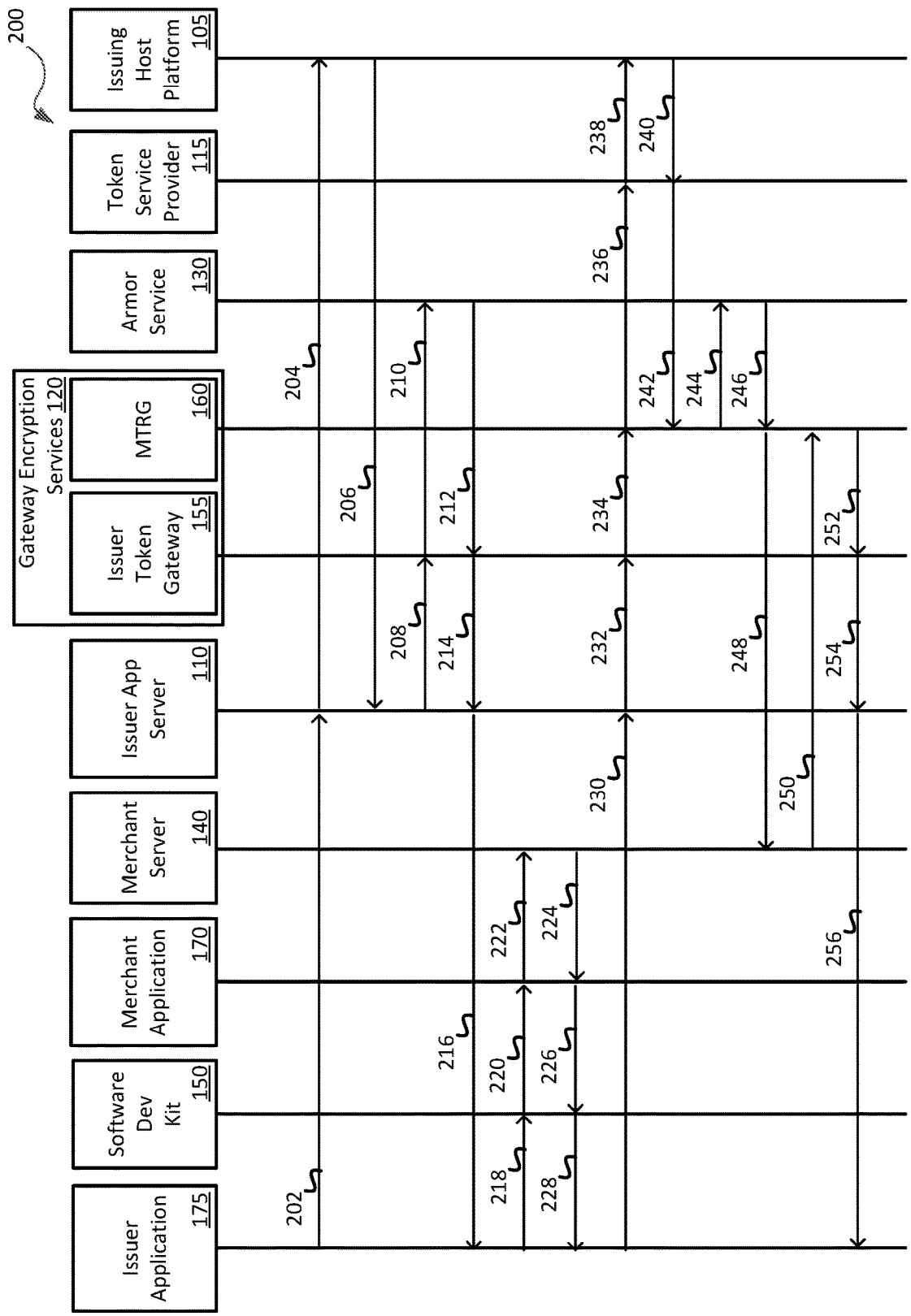
FIG. 2 illustrates a swim diagram depicting synchronizing payment account information to a merchant from an issuer application, according to an embodiment.

FIG. 2 illustrates a swim diagram 200 of a method for synchronizing payment account data for a user from an issuer application using the components described with respect to FIG. 1. Along the top of the swim diagram 200, the components described with respect to FIG. 1 are shown including issuer application 175, software development kit 150, merchant application 170, merchant server 140, issuer application server 110, gateway encryption services 120 including issuer token gateway 155 and MTRG 160, armor service 130, token service provider 115, and issuing host platform 105.

Beginning with the issuer application 175, the user may attempt to log into the issuer application 175, and issuer application 175 may transmit user information, shown by arrow 202, entered by the user using the user interface of the issuer application 175 to the issuer application server 110. The user information may include, for example, a user name and password. The user name and password may be encrypted for transmission.

The issuer mobile application server 110 may authenticate the user using the user information (e.g., a user name and password, biometric data, and so forth). The issuer mobile application server 110 may transmit a request, shown by arrow 204, to issuing host platform 105 for a list of eligible accounts for the user. The eligible accounts may include any user accounts the issuer has recorded for the user. For example, a user may have one or more checking or savings accounts associated with one or more debit cards and/or one or more credit cards from the same issuer (e.g., Wells Fargo, Capital One, and so forth).

The issuing host platform 105 may transmit the full primary account number ("PAN") data (e.g., the full sixteen digit account number) for each eligible account for the user to the issuer application server 110 as shown by arrow 206. The issuer application server 110 may determine which merchants may be eligible for synchronization of the account information, including access links for the merchants. The issuer application server 110 may transmit the PAN data and the eligible merchant information to the issuer token gateway 155 of the gateway encryption services 120 as shown by arrow 208. The issuer token gateway 155 may identify the corresponding issuer tokens for the PAN data and request, from the armor service 130, token status information for each merchant of the eligible merchants for the identified issuer tokens as shown by arrow 210. The armor service 130 may identify corresponding merchant-facing tokens for each of the eligible merchants that have a token for the associated issuer token associated with the payment accounts for which the issuer sent PAN data. The armor service 130 may transmit, as shown by arrow 212, the token status information to the issuer token gateway 155. The token status information may include information about a merchant token for the merchant and payment account pairing. For example, if the customer already has the payment account saved at the merchant, the token status may indicate that the token is generated or saved. If the user has never used the payment account at the merchant, the token status may indicate that the token is not yet generated The issuer token gateway 155 may send the token status information to the issuer app server 110 as shown by arrow 214. In some embodiments, the merchant may not subscribe to the armor service 130, such as merchant server 140b. In such embodiments, the merchant server 140b can identify the token service provider token assigned to that merchant by the token service provider 115. The token status of the token service provider token for the merchant may also be provided to the issuer app server 110 by the issuer token gateway in such embodiments.

The issuer app server 110 may provide the merchant token status information to the issuer application 175, shown by arrow 216. The issuer application 175 may display, for example, save buttons to the user for saving their card information to the eligible merchants that do not currently have their information. In some embodiments, the issuer application 175 may have a checkbox to allow the user to select whether to make a card the default payment method at that merchant. In some embodiments, a "save" button and a "save as default" button may be presented for the user to select whether to make the card the default payment form at that merchant. In some embodiments, the user may have requested an updated card because, for example, the user's card was lost or stolen. In such cases, the issuer application 175 may automatically update the user's card information at each merchant that has the user's previous card information. In other embodiments, the issuer application 175 may provide, for example, an update button, that allows a user to update their card information at merchants that had the previous card information, which may no longer be valid. The user may also be able to provide their card information to merchants that did not previously have their card information.

Upon selection of a save or update button by a customer, the issuer application may access the software development kit 150 as shown by arrow 218. As shown by arrow 220, the software development kit 150 may launch the merchant application or website 170.

The user may provide credentials for logging into the merchant application since the issuer does not typically have the user's merchant credential information. As shown by arrow 222, the merchant application 170 may provide the merchant server 140 with credentials for logging in. The merchant server 140 may authenticate the customer and provide the authentication indication to the merchant application 170 as shown by arrow 224. The merchant application 170 may communicate through the software development kit 150 as shown by arrows 226 and 228 with the issuer application 175 to provide merchant provision data. The merchant provision data may include a merchant nonce and may be encrypted with, for example, a public key used by the MTRG 160 that has the private key for decryption. The merchant provision data may also include merchant pass-through data that may allow the merchant to send any additional data needed to correlate requests from the same user including a user ID, session ID, or transaction ID, for example.

The issuer application 175 may transmit the encrypted merchant provision data to the issuer application server 110 as shown by arrow 230. If the user had selected to save the card as the default payment method, for example, by clicking the save as default button or checking a box, an indicator that this payment form should be made the default is also transmitted at arrow 230. The issuer application server 110 may generate an issuer nonce and provide it, the encrypted merchant provision data, and PAN data to the issuer token gateway 155 as shown by arrow 232. As shown by arrow 234, the issuer token gateway 155 may provide the issuer nonce, encrypted merchant provision data, and PAN data to the MTRG 160. MTRG 160 may decrypt the merchant provision data.

In some embodiments, the issuer may not use a token service provider 115, such as the issuer associated with issuer application server 110b. For such issuers, arrows 236, 238, 240, and 242 may not apply and instead of those steps, the PAN is sent to the armor service 130 at arrow 244. For issuers that use a token service provider 115, the MTRG 160 transmits a provision request including the merchant provision data and the PAN data to the token service provider as shown by arrow 236. The token service provider 115 can request authorization for the provision from the issuing host platform 105 as shown by arrow 238. The issuing host platform 105 may transmit an approval (or denial in some cases) for the provision as shown by arrow 240. If the provision is approved, the token service provider 115 may generate an issuer token or identify an existing issuer token. The token service provider 115 may provide the provision response with the token service provider issuer token to MTRG 160 as shown by arrow 242.

As shown at arrow 244, the MTRG 160 may transmit the issuer token (or the PAN data if no token service provider 115 is used for the issuer) to the armor service 130. The armor service 130 may find a mapping for the issuer token (or PAN data) to the merchant-facing token stored in the secure vault 135 of the armor service 130. The armor service 130 may retrieve the merchant-facing token associated with the customer account for the issuer and the merchant for which the card information is being saved or updated. In some embodiments, the merchant-facing token may not yet be generated and no mapping found. In such cases, the armor service 130 may generate a merchant-facing token for the merchant and the customer account of the issuer. As shown by arrow 246, the merchant-facing token is provided to the MTRG 160. The MTRG 160 can provide the merchant-facing token to the merchant server 140 as shown by arrow 248. In addition to receiving the merchant-facing token, the merchant nonce may be received as it may have been transmitted at each arrow since it was generated by merchant server 140 after receiving the credential information at arrow 222. The merchant server may compare the received merchant nonce with its known merchant nonce and, if they match, save the merchant-facing token to the merchant's vault 145. If the user had selected to make this payment form the default, the default indicator is also transmitted at each arrow since it was generated an initially transmitted at arrow 230, and the merchant server 140 receives the default indicator and may save the default indicator with the merchant-facing token in the merchant's vault 145. The merchant may also remove any default indicators for other forms of payment for that user within merchant vault 145. Having a merchant-facing token for the underlying primary account for the user, the merchant now has a single, evergreen token for the account. As described herein, this creates efficiencies and benefits to the system such that the merchant need not store duplicate tokens or references to the same account including for saved information, a swiped card, or payment with the account via a pay wallet, which generates a differing sixteen digit account number to shield the primary account number. The evergreen nature of the token ensures that transactions using the payment account succeed even if the primary account number changes and regardless of the way the payment account is used. This ensures processing cycles are not wasted by failed transactions, network traffic is reduced by eliminating failed transactions, and storage is minimized because a single token is used for the account for that merchant.

Merchant server 140 may respond at arrow 250 to MTRG 160 with a confirmation that the token has been saved in its vault. At arrow 252, MTRG 160 may transmit confirmation to issuer token gateway 155. The issuer token gateway 155 may transmit confirmation to the issuer server 110 at arrow 254. The issuer app server 110 may provide confirmation of successful saving of the card information to the user through the issuer application 175 as shown at arrow 256.

Figure 3:
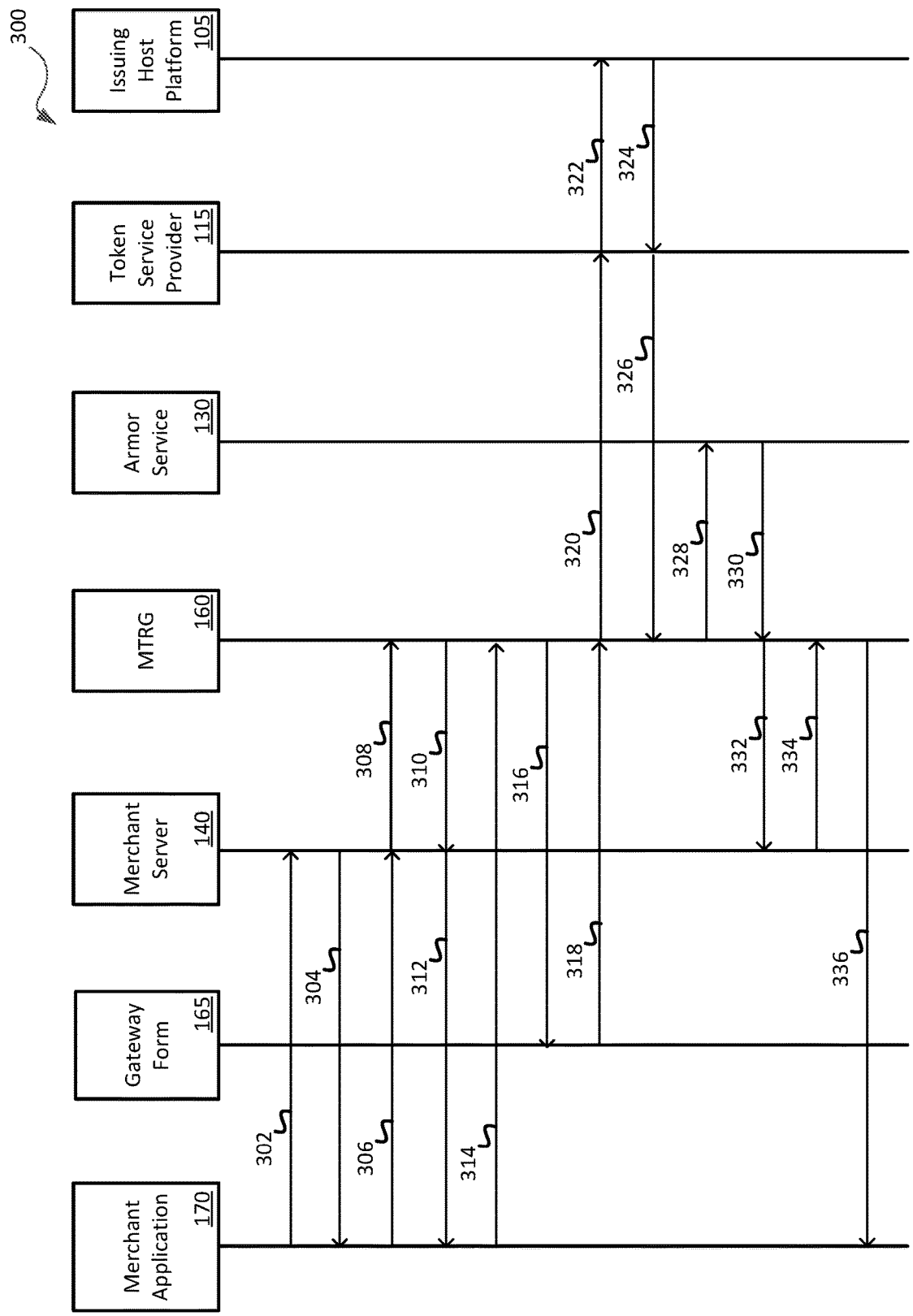
FIG. 3 illustrates a swim diagram depicting synchronizing payment account information to a merchant from the merchant application, according to an embodiment.

FIG. 3 illustrates a swim diagram 300 a method for synchronizing payment account data for a user from a merchant application using the components described with respect to FIG. 1. Along the top of the swim diagram 300, the components described with respect to FIG. 1 are shown including merchant application 170, gateway form 165, merchant server 140, MTRG 160, armor service 130, token service provider 115, and issuing host platform 105.

Beginning with the merchant application 170, the user may provide login credentials to the merchant application 170, and the merchant application 170 may transmit those credentials to merchant server 140 as shown at arrow 302. The merchant server 140 may authenticate the user and respond to the merchant application 170 with the authentication response as shown by arrow 304. The merchant application 170 may provide a save card function for the user to enter a payment card for saving by the merchant so the user does not have to enter the payment information for each purchase, for example. The user may select the save card button, and the merchant application may transmit the save card request to the merchant server 140 as shown by arrow 306. The merchant server may generate a merchant nonce and send the request to save the card with the merchant nonce to the MTRG 160 as shown by arrow 308. The MTRG 160 may generate an MTRG nonce and save the merchant nonce/MTRG nonce pair temporarily. The MTRG 160 may respond at arrow 310 to the merchant server 140 with the MTRG nonce. The merchant server 140 may send the MTRG nonce to the merchant application 170 as shown by arrow 312.

When the merchant application 170 receives the MTRG nonce, the merchant app may allow a webview if in a mobile application or a redirect if in a web application posting the MTRG nonce to the MTRG 160 as shown by arrow 314. The MTRG 160 may compare the received MTRG nonce and, if it matches the MTRG nonce previously generated, redirect to the gateway form 165 for display to the user such that the user sees the gateway form 165 within the merchant application 170 environment as shown by arrow 316.

The user may enter the requested information into gateway form 165 including, for example, the card primary account number, the account owner's name, address, and telephone number, and so forth. Upon the user indicating the information is ready to be submitted via, for example, a submit button, the entered information is sent as shown by arrow 318 to MTRG 160. The MTRG 160 may mark the MTRG nonce as consumed and prepare the token service provider 115 provision request. As shown by arrow 320, MTRG 160 may send the provision request to the token service provider 115. The token service provider can request authorization to provision a token from the issuing host platform as shown by arrow 322. The issuing host platform 105 may provide authorization (or decline authorization) and send the response at arrow 324 back to token service provider 115. The token service provider 115 may provision the issuer token for the payment account. In some embodiments, the issuer token may already exist or may be generated if not already generated. As shown by arrow 326, the token service provider 115 may provide the issuer token with the provision response to the MTRG 160.

In some embodiments, the issuer does not use a token service provider 115. In such cases, when the MTRG receives the card information at arrow 318, there is no provision request to the token service provider 115, and the actions at arrows 320, 322, 324, and 326 are not done.

Rather, at arrow 328 the MTRG 160 sends the primary account number (PAN) to the armor service 130. If a token service provider is used, the MTRG 160 sends the issuer token to the armor service 130. The armor service stores the PAN or the issuer token in the secure vault 135 with a mapping to the merchant-facing token. If a merchant-facing token is not yet generated, the armor service 130 generates the merchant-facing token associated with the customer account and the merchant. The armor service 130 sends the merchant-facing token to the MTRG 160 at arrow 330.

In some embodiments, the merchant does not use an armor service 130. In such embodiments, the steps at arrow 328 and 330 are not performed. In such embodiments, the MTRG 160 utilizes the token service provider token for the merchant as the merchant-facing token.

At arrow 332, the MTRG 160 sends the merchant-facing token along with the merchant nonce to the merchant server 140. If the received merchant nonce matches the merchant's known merchant nonce, the merchant server 140 saves the merchant-facing token to the merchant vault 145. As described herein, a single merchant-facing token for the payment account for that merchant saves processing power, network traffic, and storage space within the system. At the merchant, the single token is saved for the payment account for use regardless of the form of payment (e.g., pay wallet, plastic card swipe, stored information), and the token remains evergreen via MTRG 160 to ensure limited failed transactions (e.g., due to the payment account primary account number changing). At the gateway encryption service 120, the single merchant-facing token limits the storage in the vault, limits transactions between the gateway encryption service 120 and the merchant as well as the issuer, and overall improves network efficiency and resource efficiency. The merchant server 140 may respond at arrow 334 to the MTRG 160 with an indication of whether the merchant-facing token is successfully saved. For example, the save may fail if the merchant nonce does not match. As shown by arrow 336, the MTRG 160 then notifies the merchant application 170 of the successful (or failed) save of the card with the merchant so the user may be notified through the merchant application 170.

Figure 4:
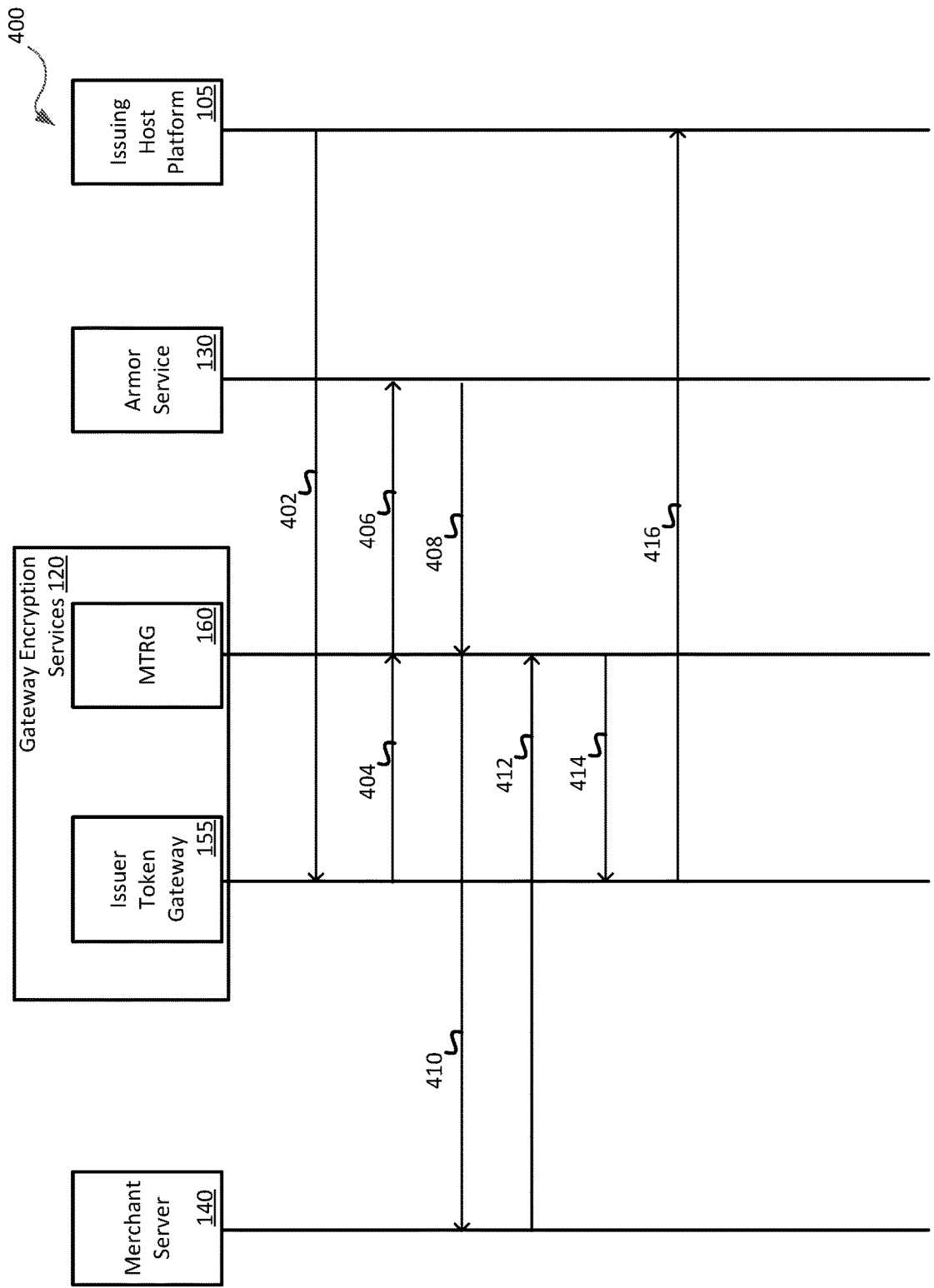
FIG. 4 illustrates a swim diagram depicting update of a primary account number for a payment account, according to an embodiment.

FIG. 4 illustrates a swim diagram 400 depicting the flow when an issuer that does not use a token service provider 115 replaces a customer's card. Beginning at the issuing host platform 105, a primary account number (PAN) update may be sent to the issuer token gateway 155 of the gateway encryption services 120 as shown by arrow 402. The issuer token gateway 155 may send the PAN update to the MTRG 160 at arrow 404. The MTRG 160 may forward the PAN update to the armor service 130 as shown by arrow 406. The armor service may identify the old PAN in the secure vault 135 and replace the old PAN with the updated PAN so that all mappings now correctly identify the new PAN with any merchant-facing tokens. The armor service 130 then notifies the MTRG 160 of the successful update at arrow 408. As shown by arrow 410, the MTRG 160 notifies the merchant server 140 that the PAN was updated but there is no change to the merchant-facing token. The merchant server 140 acknowledges the notification as shown by arrow 412. As shown by arrow 414, the MTRG 160 may transmit the notification of success to the issuer token gateway 155. The issuer token gateway 155 may transmit the success notification to the issuing host platform 105 as shown by arrow 416.

Figure 5:
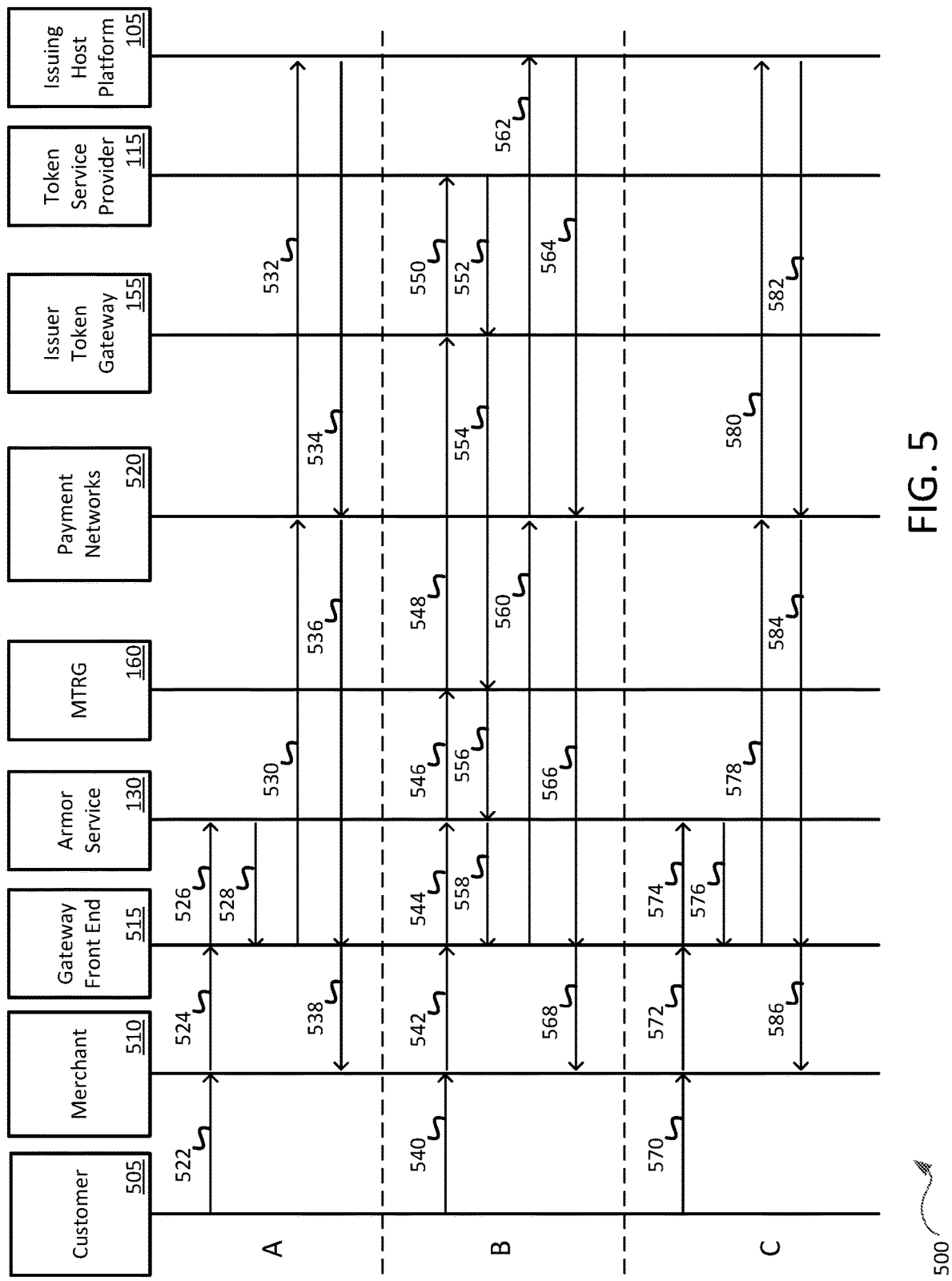
FIG. 5 illustrates a swim diagram showing synchronization of payment authorizations using differing payment methods, according to an embodiment.

FIG. 5 illustrates a swim diagram 500 depicting three purchasing scenarios for the same customer with the same payment account. The top portion of FIG. 5 depicts Scenario A, where the customer pays with a plastic credit or debit card. The middle portion of FIG. 5 depicts Scenario B, where the customer pays with a pay wallet having the account associated with the plastic credit or debit card used in Scenario A. The bottom portion of FIG. 5 depicts Scenario C, where the customer pays with the plastic credit or debit card that is stored on file at the merchant. Each scenario is performed using the components described with respect to FIG. 1. Along the top of the swim diagram 500, the components described with respect to FIG. 1 are shown including armor service 130, MTRG 160, issuer token gateway 155, token service provider 115, and issuing host platform 105. Additionally, shown along the top are customer 505, merchant 510, gateway front end 515, and payment networks 520.

The customer 505 indicates the customer paying for a transaction with a form of payment that differs between scenarios A, B, and C.

The merchant 510 may be the merchant point of sale, which may differ for each scenario A, B, and C as well. For example, when the customer pays by swiping the customer plastic card in scenario A, the merchant 510 may be a point of sale device at a brick and mortar merchant location. However, when the customer pays by using the card on file in scenario C, the merchant 510 may be merchant application 170 and merchant server 140 (combined for simplicity) used to execute the transaction.

Gateway front end 515 may be a front end interface for gateway encryption services 120 for collecting or receiving information from the merchant, particularly with a point of sale device of the merchant.

Payment networks 520 may be any payment network (e.g., Visa, MasterCard, and so forth) that issuers use for processing transactions on customer accounts issued by the issuer.

Beginning with scenario A, in which a customer 505 pays with a plastic card at the merchant 510, the PAN of the plastic card is transmitted from the customer 505 to the merchant 510 by swiping the card at a point of sale device as shown by arrow 522. The merchant 510 may encrypt the PAN and transmit it to the gateway front end 515 as shown at arrow 524. The gateway front end 515 may transmit the encrypted PAN to the armor service 130 as shown at arrow 526. The armor service 130 may decrypt the PAN and look up a mapping for the PAN and merchant to a merchant-facing token. If no merchant-facing token exists for the merchant 510 for this PAN, the armor service 130 generates the merchant-facing token. The armor service 130 may return the merchant-facing token to the gateway front end 151 as shown by arrow 528. The gateway front end 515 may transmit the PAN, typically encrypted, to the payment networks 520 as shown by arrow 530 to request authorization for the transaction. The transaction request may include the PAN, the transaction amount, the merchant for payment, and so forth. The payment network may request authorization for the transaction from the issuing host platform 105 as shown by arrow 532. The issuing host platform may authorize (or decline) the transaction and send the authorization response back to the payment networks 520 as shown by arrow 534. The payment networks 520 may forward the authorization response to the gateway front end 515 as shown by arrow 536. The gateway front end 515 then sends the authorization response, to let the merchant 510 know whether the transaction was authorized or declined, along with the merchant-facing token to the merchant 510 as shown by arrow 538.

In scenario B, a customer 505 pays with a pay wallet at the merchant 510. The customer provides the pay wallet token service provider token (the pay wallet token) for the payment account to the merchant 510, typically by holding their phone near the merchant's scanning device, as shown by arrow 540. The merchant 510 encrypts the pay wallet token and sends it to the gateway front end 515 as shown by arrow 542. The gateway front end forwards the pay wallet token to the armor service 130 as shown by arrow 544. The armor service 130 decrypts the pay wallet token and sends the pay wallet token to the MTRG 160 as shown by arrow 546. The MTRG requests a lookup of the pay wallet token that corresponds to the PAN from the issuer token gateway 155 as shown by arrow 548. The issuer token gateway requests the token service provider 115 provide the issuer token for the PAN of the underlying account associated with the pay wallet token as shown by arrow 550. As shown by arrow 552, the token service provider returns the issuer token or the PAN associated with the pay wallet token to the issuer token gateway 155. The issuer token gateway 155 forwards the issuer token or the PAN to the MTRG 160 as shown by arrow 554. MTRG 160 provides the issuer token to the armor service 130 as shown by arrow 556. The armor service 130 identifies the merchant-facing token mapped to the issuer token and merchant 510. If no merchant-facing token is found, the merchant-facing token is generated by the armor service 130. As shown by arrow 558, the armor service 130 transmits the merchant-facing token to the gateway front end 515.

As shown by arrow 560, the gateway front end 515 transmits the pay wallet token to the payment networks 520 to request authorization for the transaction. The payment networks 520 transmit the pay wallet token to the issuing host platform for authorization as shown by arrow 562. The issuing host platform 105 authorizes or declines the transaction based on whether the customer's account has sufficient funds or credit available. The issuing host platform 105 then returns the authorization result to the payment networks 520 as shown by arrow 564. As shown by arrow 566, the payment networks 520 return the authorization result to the gateway front end 515. The gateway front end 515 then provides the authorization result and the merchant-facing token to the merchant 510. Note that the merchant-facing token returned in scenario A is the same merchant-facing token returned in scenario B as long as the merchant 510 is the same and the underlying payment account primary account number (PAN) is the same for the plastic card used in scenario A and the pay wallet used in scenario B.

Scenario C depicts the flow of information and authorization for a transaction for the customer 505 using a card on file with the merchant 510. The card on file with the merchant 510 may be stored by the customer 505 at some previous time. The customer 505 may, for example, be checking out in an online storefront using a stored card. At checkout the customer 505 transmits authorization to charge the card on file to the merchant 510 as shown by arrow 570. The merchant 510 retrieves the merchant-facing token for this card on file from the merchant vault 145. The merchant 510 transmits the request for authorization with the merchant-facing token to the front end gateway 151 as shown by arrow 572. The front-end gateway forwards the merchant-facing token to the armor service 130 as shown by arrow 574. The armor service 130 may identify the issuer token corresponding to the merchant-facing token within secure vault 135 and retrieve it to send back to the gateway front end 515 at arrow 576. The gateway front end 515 may then send the issuer token with the authorization request to the payment networks 520 as shown by arrow 578. The payment networks 520 forward the authorization request for the transaction to issuing host platform 105 as shown by arrow 580. The issuing host platform 105 may authorize or decline the transaction. The issuing host platform 105 can transmit the authorization response back to the payment networks 520 as shown by arrow 582. The payment networks 520 can transmit the response to the gateway front end 515 as shown by arrow 584. The gateway front end 515 can transmit the authorization response with the merchant-facing token to the merchant 510. Again note that the merchant-facing token in scenario C is the same as in scenarios A and B when the merchant 510 is the same merchant and the underlying payment account for each scenario has the same primary account number.

Figure 6:
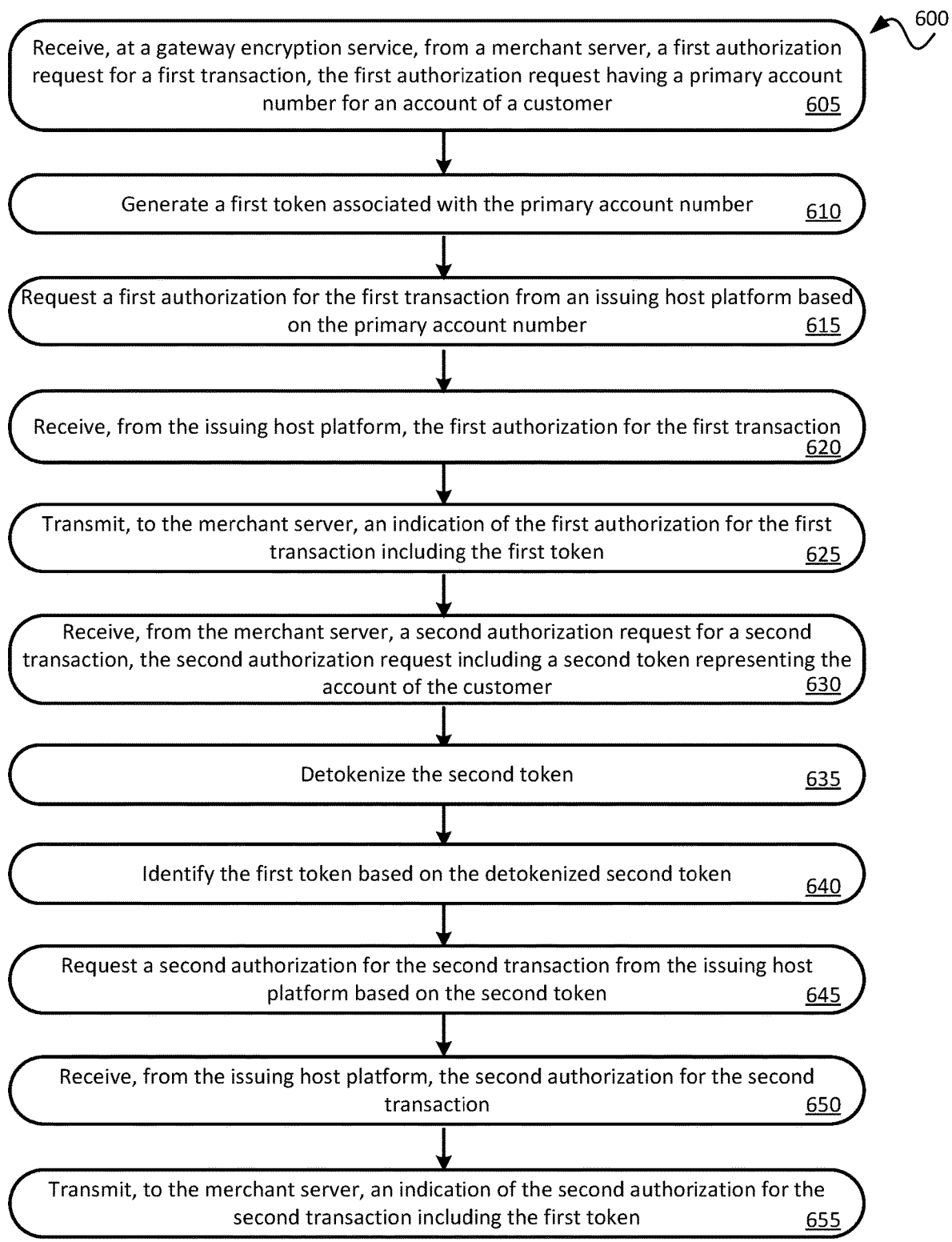
FIG. 6 illustrates a method for synchronizing tokenization using differing payment methods, according to an embodiment.

FIG. 6 illustrates a method 600 for source independent consistent tokenization. Method 600 may be performed by, for example gateway encryption service 120. At step 605 the gateway encryption service (e.g., gateway encryption service 120) may receive from a merchant server (e.g., merchant server 140) a first authorization request for a first transaction, the first authorization request having a primary account number for an account of a customer. For example, the gateway front end 515 may receive the request for authorization of the transaction from merchant 510, as described with respect to FIG. 5. The request may include a primary account number (PAN) when, for example, a customer 505 swipes a plastic card at a merchant 510 point of service as described with respect to scenario A of FIG. 5. In some embodiments, a pay wallet may have a 16-digit number that looks similar to a PAN, however, this is a different number from the PAN to protect the security of the PAN. The pay wallet number may correspond to the PAN at the issuer host platform 105 or the token service provider 115 in some embodiments.

At step 610, the gateway encryption service may generate a first token associated with the primary account number. For example, in some embodiments, the armor service 130 may be part of the gateway encryption services 120 and generate the first token, which may be a merchant-facing token. In some embodiments, the gateway front end 515 may send the authorization request to the armor service 130 to have the first token (i.e., the merchant-facing token) generated. In some embodiments, the merchant-facing token already exists and is provided rather than generated. When already existing, the armor service 130 looks up a mapping of the PAN to the merchant-facing token for that merchant 510 to provide the merchant-facing token.

At step 615, the gateway encryption service may request a first authorization for the first transaction from an issuing host platform based on the PAN. For example, the gateway front end 515 may, via the payment network 520, request the authorization as shown in Scenario A of FIG. 5. The request may include the PAN, the amount of the transaction, the merchant information for the merchant 510 requesting authorization, and so forth. The request may be encrypted for security.

At step 620 the gateway encryption services, for example the gateway front end, may receive, from the issuing host platform, the first authorization for the first transaction. For example, the issuing host platform 105 may authorize the transaction based on the PAN, transaction amount, and merchant information and then return the authorization indication. In some embodiments, the authorization may be transmitted via the payment networks 520. For example, the gateway front end 515 may transmit the request to the payment networks 520, and payment networks 520 transmits the request to issuing host platform 105. The issuing host platform may authorize (or decline) the transaction and send the authorization response to the payment networks 520. The payment networks 520 can then transmit the authorization response to the gateway front end 515.

At step 625 the gateway encryption services may transmit, to the merchant server, an indication of the first authorization (e.g., approved or declined) and include the first (merchant-facing) token. For example, the gateway front end 515 may transmit the first token and the authorization response to merchant 510.

At step 630 the gateway encryption service may receive a second authorization request for a second transaction, where the second authorization request includes a second token representing the account of the customer. For example, a customer 505 may use a pay wallet to pay for the second transaction where the pay wallet is set up to use the same card as used for the first transaction as described in scenario B of FIG. 5. The pay wallet may transmit the pay wallet number, which may be a sixteen digit number resembling a PAN, or the pay wallet may transmit a pay wallet token representing the account.

At step 635 the gateway encryption service may detokenize the second (pay wallet) token. At step 640 the gateway encryption service may identify the first (merchant-facing) token based on the detokenized second token. As described with respect to scenario B of FIG. 5, the armor service 130 may decrypt the second (pay wallet) token and transmit it to the MTRG 160 to detokenize. The MTRG 160 may request from the issuer token gateway 155 or the token service provider 115 the issuer token or the PAN associated with the second (pay wallet) token. The MTRG 160 may provide the PAN or issuer token to the armor service 130, which can return the merchant-facing (first) token to the gateway front end 515.

At step 645 the gateway encryption service may request a second authorization for the second transaction from the issuing host platform based on the second token. For example the gateway front end 515 may send an authorization request with the second (pay wallet) token, the transaction amount, and merchant information to the payment networks 520 to request authorization from the issuer host platform 105 as shown in scenario B of FIG. 5. The issuer host platform 105 may authorize or decline the transaction and send the authorization response to the payment networks 520 for return to the gateway front end 515 at step 650.

At step 655 the gateway encryption service may transmit an indication of the second authorization for the second transaction including the first (merchant-facing) token to the merchant server. For example, the gateway front end 515 may transmit the authorization and first token to the merchant 510. Note that regardless of the payment method for the underlying account, the merchant receives the same merchant-facing (first) token so the merchant can associate the transactions.

Figure 7:
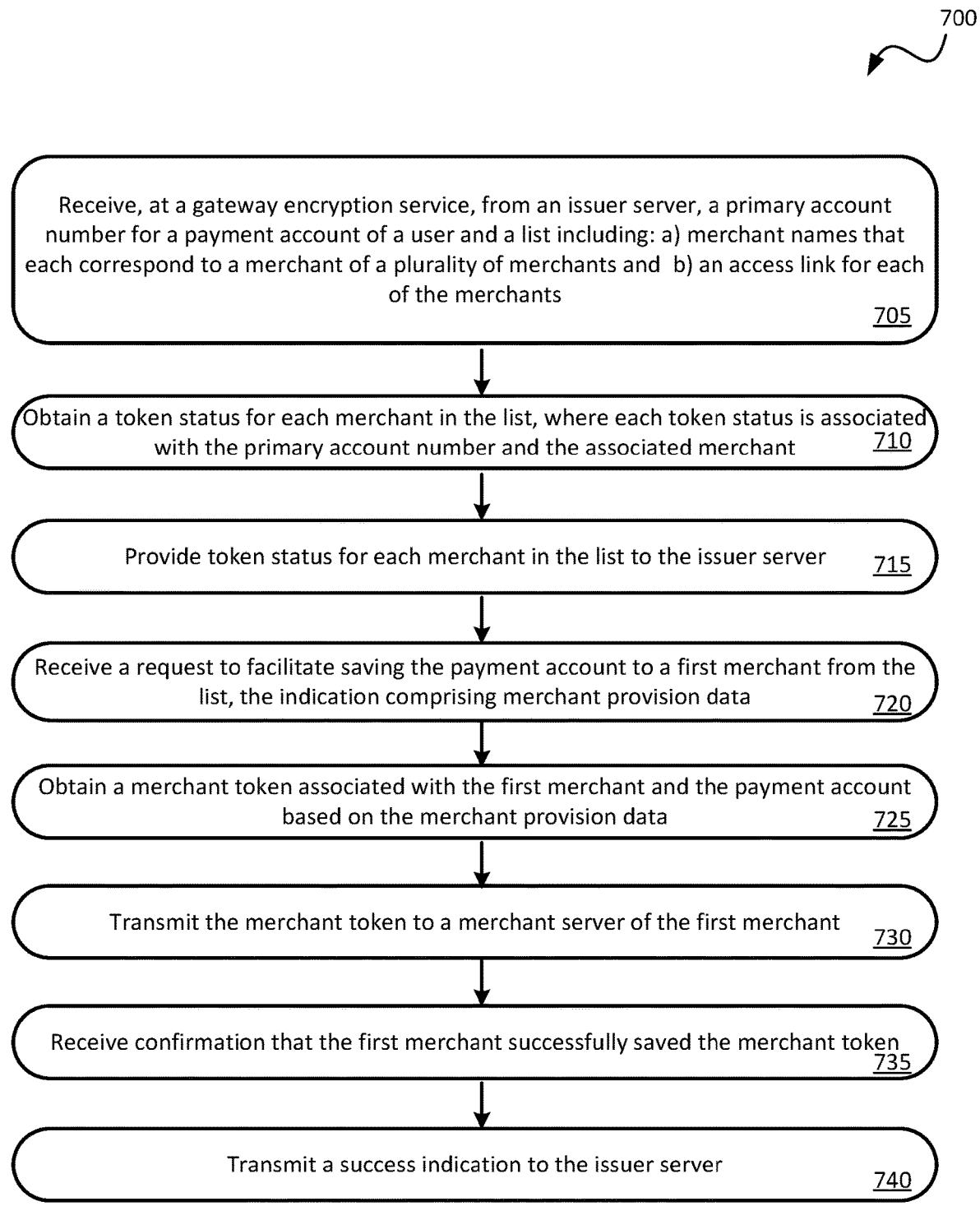
FIG. 7 illustrates a method for synchronizing payment account information to a merchant from an issuer application, according to an embodiment.

FIG. 7 illustrates a method 700 for synchronizing a payment account for a merchant from an issuer server. Method 700 may be performed by, for example, gateway encryption service 120. At step 705 the gateway encryption service may receive, from an issuer server, a primary account number for a payment account of a user and a list including a) merchant names that each correspond to a merchant of a plurality of merchants and b) an access link for each of the merchants. For example, the customer may log into an issuer application 175 that connects to an issuer server 110 for authenticating the customer and serving the issuer application 175. The issuer server 110 may obtain the list of eligible merchants to which the issuer allows saving the customer account through the issuer application along with a merchant link for each. The merchant link may be a link that provides access to the merchant. When the user is using a web browser application to connect to the issuer application/website, the merchant link may be a link to the merchant's website. When the user is using a mobile device app, the merchant link may be a link to the merchant's mobile app on the mobile device. The issuer server 110 may provide the list to the issuer token gateway 155 of the gateway encryption services 120 as described in FIG. 2. In some embodiments, the list may include a token status for the payment account with the merchant, and in some embodiments, the list may not include the token status until the merchant and link list is provided from the issuer token gateway 155 to the armor service 130. At step 710, the gateway encryption service 120 obtains a token status for each merchant in the list, where each token status is associated with the primary account number and the associated merchant. The gateway encryption service 120 may request the token status from the armor service 130. The armor service 130 may identify the token status for each merchant and the payment account. Once the armor service 130 provides the token status, the list can be complete including the token status with the merchant information. In some embodiments, multiple account numbers can be provided from the issuer server at step 705. In such embodiments, each primary account number and merchant are paired to identify a token status for each pair.

At step 715, the gateway encryption service may provide the token status for each merchant in the list to the issuer server. For example, the issuer token gateway 155 may provide the list, or at least some portion of the list, to the issuer server 110.

At step 720 the gateway encryption service 120 may receive a request to facilitate saving the payment account to a first merchant from the list. The request may include merchant provision data for the first merchant. For example, the issuer server 110 may display to the user via the issuer application 175 the list of merchants along with a "save," "update," and/or "delete" button for each merchant in the list, for example. The user may choose to update the account information for any merchants that have an existing token, for example, by clicking the update button which may be displayed for merchants that have a token status of generated. In some embodiments, no "update" button will be used because merchants with a token status of generated may be automatically updated. As another example, the customer may click the delete button to remove their payment account from a merchant that has a token status of generated. As yet another example, the customer may click the save button (or save as default button to make the card the default payment for that merchant) for a merchant that did not previously have a token so that the token status may indicate not yet generated. Upon clicking save, the issuer application 175 may send the indication to the issuer server 110. The issuer server 110 may then begin actions to perform the request (e.g., delete, modify, or save the payment account information to the merchant). For example, the issuer application 175 may launch the merchant application using the software development kit 150. The software development kit 150, part of the gateway encryption service 120, may then facilitate actions. The user may log into the merchant application and the software development kit 150 may be used by the issuer application 175 to obtain and encrypt merchant provision data to send to the issuer server 110. The issuer server 110 may generate an issuer nonce and submit the issuer nonce with the PAN data for the payment account and the encrypted merchant provision data for provisioning to the issuer token gateway 155.

At step 725 the gateway encryption service may obtain a merchant token (i.e., merchant-facing token) associated with the merchant and the payment account based on the merchant provision data. For example, the issuer token gateway 155 may provide the issuer nonce, PAN data for the payment account, and encrypted merchant provision data to the MTRG 160. The MTRG 160 may request provision authorization from the token service provider 115. Once authorization is received along with the issuer token, the MTRG 160 may request the merchant-facing token from the armor service 130. If the merchant-facing token does not already exist for the merchant and payment account, the armor service 130 may generate the merchant-facing token. In some embodiments, the issuer does not use an issuer token service provider 115. In such cases, the MTRG 160 may not send a provision request to the token service provider 115. Rather, the MTRG 160 simply provides the PAN to the armor service 130 to get or generate the merchant-facing token. The armor service 130 may save the merchant-facing token along with a mapping to the PAN or issuer token in the secure vault 135.

At step 730, the gateway encryption service may transmit the merchant token to the merchant server for the merchant along with the merchant provision data. For example, the MTRG 160 may transmit the merchant (merchant-facing) token to the merchant server 140 as shown in FIG. 2. The merchant server can validate that the merchant nonce received is the same as what was supplied by the merchant server in step 720, thereby allowing the merchant server to trust the request in Step 730 as being for the same customer the merchant authenticated in Step 720. When the user has selected this card as the default for this merchant by, for example, selecting a checkbox or a save as default button, the gateway encryption service may also transmit a "default" indicator. The merchant server, upon receipt of this information, may mark the first token as the customer's default for user experiences such as one-click checkout. The merchant server may also un-mark any other token that may have been the previous default.

At step 735 the gateway encryption service may receive a confirmation from the merchant server that the first merchant successfully saved the merchant token. In response to receiving the confirmation, the gateway encryption service 120 may transmit a success indication to the issuer server at step 740. For example, if the payment account information is successfully saved to the merchant server 140, the MTRG 160 may receive the success indication from the merchant server 140 and transmit that to the issuer token gateway 155. The issuer token gateway 155 may transmit the success indication to the issuer server 110.

Figure 8:
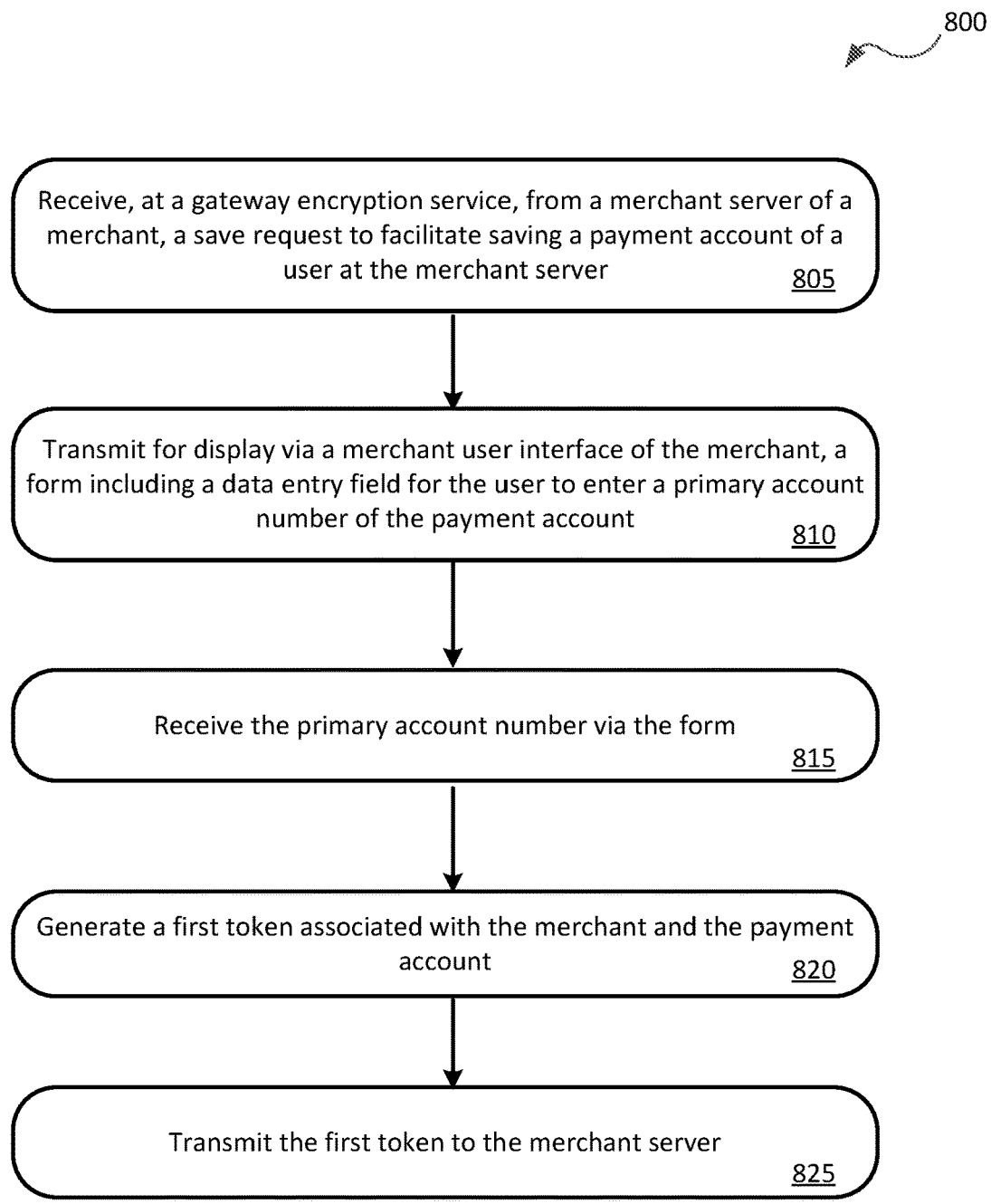
FIG. 8 illustrates a method for synchronizing payment account information to a merchant from the merchant application, according to an embodiment.

FIG. 8 illustrates a method 800 for synchronizing and saving a customer card on file at a merchant from a merchant application. Method 800 may be performed by a gateway encryption service such as gateway encryption service 120. Method 800 begins at step 805 with the gateway encryption service receiving from a merchant server of a merchant a save request to facilitate saving a payment account of a user at the merchant server. For example, the customer may log into a merchant application 170 and request that the merchant save the user's credit card on file at the merchant for future use as shown in FIG. 3. The merchant server may receive the indication requesting to save the card information and send an indication to the MTRG 160.

At step 810, responsive to receiving the save request, the gateway encryption service may transmit for display via the merchant user interface of the merchant application, a form including a data entry field for the user to enter a primary account number of the payment account. For example, MTRG 160 may instruct the merchant server 140 to redirect or webview the gateway form 165 via the merchant application 170. Gateway form 165 may provide data entry fields for the customer to enter the payment account primary account number (PAN) along with the account holder's name, address, and telephone number, for example.

At step 815 the gateway encryption service may receive the PAN via the form. For example, the MTRG 160 may receive the PAN from the user entering the PAN in the gateway form 165.

At step 820 the gateway encryption service may generate a first token associated with the merchant and the payment account. For example, if the customer had not previously used the payment account (either via swiping the plastic card at the merchant, using a pay wallet at the merchant, or saving the card with the merchant previously) the gateway encryption service may generate the merchant-facing token. For example, the MTRG 160 may send the PAN data if the issuer does not use a token service provider 115 or the issuer token to the armor service 130. The armor service 130 may generate the first (merchant-facing) token for the merchant and the payment account if one does not already exist for the combination of the merchant and the payment account.

At step 825, the gateway encryption service may transmit the first token to the merchant server. For example, the MTRG 160 may receive the first token from the armor service 130. The MTRG 160 may send the first token to the merchant server 140 for the merchant server 140 to save in the merchant vault 145. When the customer uses the saved account in the future, as shown in scenario C of FIG. 5, the merchant may transmit the first token to the gateway encryption service with the request to authorize the transaction.

Figure 10:
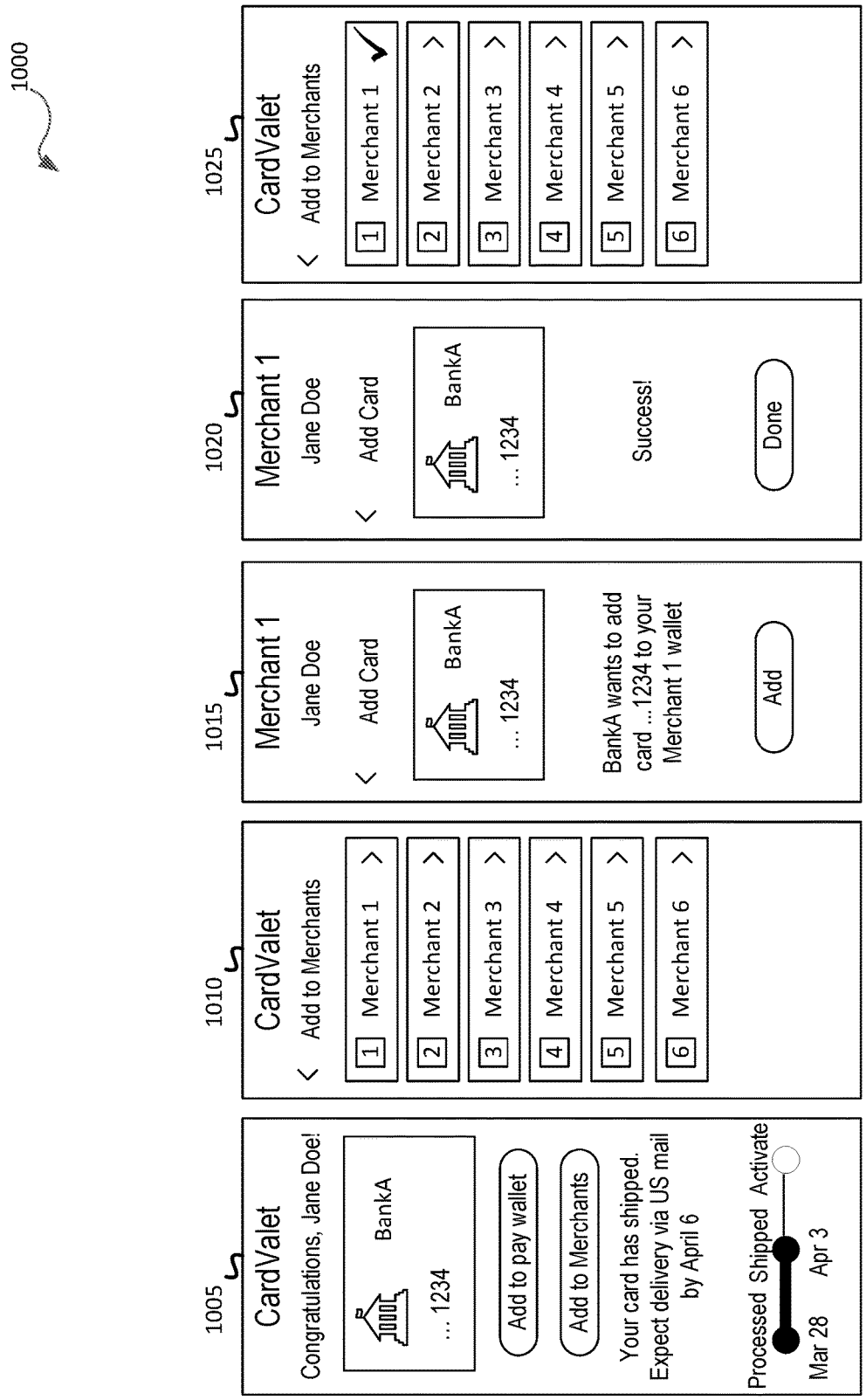
FIG. 10 illustrates a user experience flow of graphical user interfaces, according to an embodiment.

FIG. 10 illustrates an example user experience of graphical user interfaces 1000. Each of the graphical user interfaces 1005, 1010, 1015, 1020, and 1025 may be displayed via a user interface of a user's device, such as a smartphone or other computer device. The experience for the user is displayed as of obtaining a new payment account at an issuer bank. As shown in graphical user interface 1005, the user (e.g., Jane Doe) is issued a new card by an issuer (e.g., BankA) having a primary account number ending with the last four digits being "1234." The graphical user interface 1005 indicates that on March 28 the new payment account was processed, on April 3 the card shipped, and the card is expected to arrive via US mail by April 6 for the user to activate. In the meantime, the graphical user interface provides the option for the user to add the new payment account to the user's pay wallet (e.g., Samsung Pay or Apple Pay) or add the new payment account to a merchant.

Graphical user interface 1010 is displayed upon the user selecting the "Add to Merchants" button on the graphical user interface 1005. As discussed above, selecting the Add to Merchants button by the user may cause the issuer application 175 via which the user is viewing the graphical user interfaces 1005 and 1010, to request the merchants from the issuer app server 110. The issuer app server 110 may return the list of eligible merchants for display at the issuer application 175 in graphical user interface 1010. The merchants are shown as merchant 1 through merchant 6. These merchants may be any merchants that accept payment via an electronic payment method or stored payment method including, for example, any merchant or service provider (e.g., Uber®, Nordstroms®, Starbucks®, and so forth). In some embodiments, the issuer app server 110 may request the token status for the payment account for each merchant from the gateway encryption services 120. In the event depicted, the account is new, so the token status may all be not yet generated, for example.

Graphical user interface 1015 is displayed upon selection of Merchant 1 by the user from graphical user interface 1010. Here, it shows that the user may choose to add the payment account from BankA having the primary account number ending in 1234 to Merchant 1 for saving.

Graphical user interface 1020 is displayed upon selection of the Add button in graphical user interface 1015 when the merchant-facing token for the merchant and payment account is saved by the merchant. For example, upon selection of the add button, the issuer application 175 may ensure that the user logs into the merchant server in interim graphical user interfaces. Upon receiving the authentication from the merchant server, including merchant provision data, the issuer application 175 provides the information to the issuer application server 110. The issuer application server 110 requests that the gateway encryption services 120 facilitate saving the payment account with the merchant. The gateway encryption services 120 may request the merchant facing token by requesting the information from the token service provider 115. The token service provider 115 may request the issuing host platform 105 authorize provisioning the account at the merchant. The issuing host platform 105 provides the authorization to the token service provider 115. The token service provider 115 provides the issuer token for the payment account to the gateway encryption service 120. The gateway encryption service can then obtain the merchant-facing token from the armor service 130. The armor service 130 provides the merchant-facing token to the gateway encryption service. The gateway encryption service 120 provides the merchant-facing token to the merchant server 140 for saving and receives a confirmation that the merchant server saved the merchant-facing token for the merchant associated with the payment account for the user. The gateway encryption service 120 provides the confirmation to the issuer app server 110, which passes the confirmation of success to the issuer application 175. The confirmation received at the issuer application 175 causes the graphical user interface 1020 to display a success indication.

Graphical user interface 1025 is displayed upon selection of the Done button in the graphical user interface 1020. As shown by the checkmark by Merchant 1, the payment account is saved at Merchant 1. Any other indication may be used including text or other graphics to indicate the payment has been saved at the merchant.

FIG. 9 illustrates an embodiment of a computer system 900. A computer system 900 as illustrated in FIG. 9 may be incorporated into devices such as a personal computer, server computer, mobile device (e.g., smartphone, smart watch, tablet, and the like), point of service ("POS") terminal, and the like. FIG. 9 provides a schematic illustration of one embodiment of a computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905, or may otherwise be in communication, as appropriate. The hardware elements may include one or more processors 910, including without limitation one or more general-purpose processors and/or one or more special-purpose processors such as digital signal processing chips, graphics acceleration processors, and/or the like. The hardware elements may further include one or more input devices 915, which can include without limitation a mouse, a keyboard, a camera, a remote control, and/or the like. The hardware elements may further include and one or more output devices 920, which can include without limitation a display device, a printer, and/or the like.

The computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 930 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate transaction and/or other information via the communications subsystem 930. In other embodiments, a portable electronic device, may be incorporated into the computer system 900 (e.g., an electronic device), as an input device 915. In many embodiments, the computer system 900 will further comprise a working memory 935, which can include a RAM or ROM device, as described above.

The computer system 900 also can include software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 6, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 900 to perform methods in accordance with various embodiments of the technology. According to a set of embodiments, some or all of the procedures of such methods are performed by the computer system 900 in response to processor 910 executing one or more sequences of one or more instructions, which might be incorporated into the operating system 940 and/or other code, such as an application program 945, contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 and/or components thereof generally will receive signals, and the bus 905 then might carry the signals and/or the data, instructions, etc. carried by the signals to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

The invention claimed is:

1. A system for source independent consistent tokenization, the system comprising:
   one or more processors; and
   one or more memories having stored thereon instructions that, upon execution by the one or more processors, cause the one or more processors to:
      receive, from a merchant server, a first authorization request for a first transaction, the first authorization request comprising a primary account number for an account of a customer;
      generate a merchant-facing token associated with the primary account number;
      request a first authorization for the first transaction from an issuing host platform based on the primary account number;
      receive, from the issuing host platform, the first authorization for the first transaction;
      transmit, to the merchant server, an indication of the first authorization for the first transaction comprising the merchant-facing token;
      receive, from the merchant server, a second authorization request for a second transaction, the second authorization request comprising a second token representing the account of the customer, wherein the second token is not the merchant-facing token or the primary account number;
      detokenize the second token;
      identify the merchant-facing token based on the detokenized second token;
      request a second authorization for the second transaction from the issuing host platform based on the second token;
      receive, from the issuing host platform, the second authorization for the second transaction; and
      transmit, to the merchant server, an indication of the second authorization for the second transaction comprising the merchant-facing token.

2. The system of claim 1, wherein the second token represents a pay wallet token for the account of the customer.

3. The system of claim 1, wherein the primary account number received from the merchant server is encrypted.

4. The system of claim 1, wherein the instructions to identify the merchant-facing token based on the detokenized second token comprises further instructions that, upon execution by the one or more processors, cause the one or more processors to:
   search a mapping database for the merchant-facing token based on the second token.

5. The system of claim 1, wherein the instructions to identify the merchant-facing token based on the detokenized second token comprises further instructions that, upon execution by the one or more processors, cause the one or more processors to:
   obtain the primary account number based on the detokenized second token; and
   search a mapping database for the merchant-facing token based on the primary account number.

6. The system of claim 1, wherein the one or more memories have stored thereon further instructions that, upon execution by the one or more processors, cause the one or more processors to:
   receive, from the merchant server, a third authorization request for a third transaction, the third authorization request comprising the merchant-facing token;
   request a third authorization for the third transaction from an issuing host platform based on the merchant-facing token;
   receive, from the issuing host platform, the third authorization for the third transaction; and
   transmit, to the merchant server, an indication of the third authorization for the third transaction comprising the merchant-facing token.

7. A system for synchronizing payment account information with merchants, the system comprising:
   one or more processors; and
   one or more memories having stored thereon instructions that, upon execution by the one or more processors, cause the one or more processors to:
      receive, from an issuer server, a primary account number for a payment account of a user and a list comprising:
         a plurality of merchant names, wherein each merchant name corresponds to a respective one of the plurality of merchants, and
         an access link for each of the plurality of merchants;
      obtain a token status for each merchant in the list, where each token status is associated with the primary account number and the associated merchant;
      provide the token status for each merchant in the list to the issuer server;
      receive a request to facilitate saving the payment account to a first merchant from the list, the request comprising merchant provision data for the first merchant;
      obtain a merchant token associated with the first merchant and the payment account based on the merchant provision data and the primary account number for the payment account;
      transmit the merchant token to a merchant server of the first merchant;
      receive confirmation that the first merchant successfully saved the merchant token;
      transmit a success indication to the issuer server;
      receive an authorization request comprising a second token; and
      detokenize the second token to identify the merchant token.

8. The system of claim 7, wherein the instructions to obtain a merchant token associated with the first merchant and the payment account comprises further instructions that, upon execution by the one or more processors, cause the one or more processors to:
   transmit a provision request to a token service provider, the provision request comprising at least a portion of the merchant provision data;
   receive, in response to the provision request, an issuer token associated with the second token from the token service provider, wherein the merchant token is different from the issuer token; and
   save the merchant token, the issuer token, and a mapping that associates the merchant token and the issuer token in a secure data store.

9. The system of claim 7, wherein the instructions to obtain a merchant token associated with the first merchant and the payment account comprises further instructions that, upon execution by the one or more processors, cause the one or more processors to save the merchant token, the primary account number, and a mapping that associates the merchant token and the primary account number in a secure data store.

10. The system of claim 7, wherein the request to facilitate saving the payment account to the first merchant comprises an indication that the payment account is a default payment account at the first merchant for the user and wherein the instructions to transmit the merchant token to the merchant server of the first merchant comprises further instructions that, upon execution by the one or more processors, cause the one or more processors to transmit an indication to save the merchant token as the default payment account for the user.

11. A system for synchronizing payment account information at a merchant, the system comprising:
   one or more processors; and
   one or more memories having stored thereon instructions that, upon execution by the one or more processors, cause the one or more processors to:
      receive, from a merchant server of a merchant, a save request to facilitate saving a payment account of a user at the merchant server;
      transmit for display via a merchant user interface of the merchant and responsive to receiving the save request, a form comprising a data entry field for the user to enter a primary account number of the payment account;
      receive the primary account number received from the user via the form;
      generate a merchant-facing token associated with the merchant and the payment account; and
      transmit the merchant-facing token to the merchant server;
      receive an authorization request comprising a second token; and
      detokenize the second token to identify the merchant token.

12. The system of claim 11, wherein the instructions comprise further instructions that, upon execution by the one or more processors, cause the one or more processors to:
   transmit a provision request to a token service provider, the provision request comprising the primary account number and an indication of the merchant; and
   receive, in response to the provision request, the second token associated with the primary account number and the merchant.

13. The system of claim 12, wherein the instructions to generate the merchant-facing token comprises further instructions that, upon execution by the one or more processors, cause the one or more processors to save the merchant-facing token, the second token, and a mapping that associates the merchant-facing token and the second token in a secure data store.

14. The system of claim 11, wherein the instructions comprise further instructions that, upon execution by the one or more processors, cause the one or more processors to save the merchant-facing token, the primary account number, and a mapping that associates the merchant-facing token and the primary account number in a secure data store.

* * * * *

UNITED STATES PATENT AND TRADEMARK OFFICE
CERTIFICATE OF CORRECTION

| | | |
|---|---|---|
| PATENT NO. | : 11,748,744 B2 | Page 1 of 1 |
| APPLICATION NO. | : 16/837718 | |
| DATED | : September 5, 2023 | |
| INVENTOR(S) | : Royyuru et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 607 days.

Signed and Sealed this
Thirty-first Day of December, 2024

Derrick Brent
*Acting Director of the United States Patent and Trademark Office*